United States Patent
Maeda et al.

(10) Patent No.: US 8,990,767 B2
(45) Date of Patent: Mar. 24, 2015

(54) PARALLELIZATION METHOD, SYSTEM AND PROGRAM

(71) Applicant: International Business Machines Corporation, Armonk, NY (US)

(72) Inventors: Kumiko Maeda, Tokyo (JP); Shuichi Shimizu, Tokyo (JP); Takeo Yoshizawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 13/761,258

(22) Filed: Feb. 7, 2013

(65) Prior Publication Data

US 2013/0212554 A1    Aug. 15, 2013

(30) Foreign Application Priority Data

Feb. 9, 2012    (JP) .................. 2012-026145

(51) Int. Cl.
 G06F 9/44    (2006.01)
 G06F 9/45    (2006.01)
(52) U.S. Cl.
 CPC .. *G06F 8/35* (2013.01); *G06F 8/41* (2013.01); *G06F 8/451* (2013.01)
 USPC ........... 717/105; 717/106; 717/132; 717/139; 717/140; 712/221; 712/212; 712/215; 712/203; 703/2
(58) Field of Classification Search
 None
 See application file for complete search history.

(56) References Cited

U.S. PATENT DOCUMENTS

| | | | |
|---|---|---|---|
| 5,179,702 A * | 1/1993 | Spix et al. ..................... | 718/102 |
| 8,527,972 B2 * | 9/2013 | Shimura ....................... | 717/149 |
| 2004/0133616 A1 * | 7/2004 | Manevitz et al. ............. | 708/443 |
| 2006/0005179 A1 * | 1/2006 | Kawahara et al. ............ | 717/157 |
| 2006/0070047 A1 * | 3/2006 | Narayanasamy et al. .... | 717/144 |

(Continued)

FOREIGN PATENT DOCUMENTS

JP    4886838 B2    2/2012

OTHER PUBLICATIONS

Kasahara Hinonori et al., "Parallel Processing of the Solution of Ordinary Differential Equations Using Static Multiprocessor Scheduling Algorithms", IPSJ [Information Processing Society of Japan] Journal 28 (10), 1060-1070, Oct. 15, 1987.

*Primary Examiner* — Chameli Das
(74) *Attorney, Agent, or Firm* — Vazken A. Alexanian; Maeve L. McCarthy (57) ABSTRACT

A method, system, and article of manufacture for solving ordinary differential equations described in a graphical model with nodes as blocks and dependencies as links using the processing of a computer with a plurality of processors. The method includes: generating segments of block with or without duplication for each block with an internal state and for each block without any output by traversing the graphical model from each block with an internal state to each block without any output; merging the segment to reduce duplication; compiling and converting each segment from the merged results in an executable code; and individually allocating the executable code for each segment to a plurality of processors for parallel execution.

15 Claims, 10 Drawing Sheets

(56) References Cited

U.S. PATENT DOCUMENTS

| | | | |
|---|---|---|---|
| 2008/0256330 A1* | 10/2008 | Wang et al. | 712/24 |
| 2009/0003216 A1* | 1/2009 | Radunovic et al. | 370/237 |
| 2009/0089029 A1* | 4/2009 | Sturrock et al. | 703/7 |
| 2009/0094590 A1* | 4/2009 | Mendelson et al. | 717/156 |
| 2009/0167763 A1* | 7/2009 | Waechter et al. | 345/426 |
| 2009/0177960 A1* | 7/2009 | Lemoine | 715/237 |
| 2010/0088490 A1* | 4/2010 | Chakradhar et al. | 712/34 |
| 2010/0169861 A1* | 7/2010 | Wang et al. | 717/110 |
| 2011/0099351 A1* | 4/2011 | Condict | 711/216 |
| 2011/0107162 A1 | 5/2011 | Martinez Canedo et al. | |
| 2011/0238948 A1* | 9/2011 | Vorbach et al. | 712/15 |
| 2011/0246430 A1* | 10/2011 | Prahlad et al. | 707/679 |
| 2012/0159459 A1* | 6/2012 | Turner et al. | 717/138 |
| 2012/0216012 A1* | 8/2012 | Vorbach et al. | 712/11 |

* cited by examiner

PARALLELIZATION METHOD, SYSTEM AND PROGRAM

CROSS-REFERENCE TO RELATED APPLICATION

This application claims priority under 35 U.S.C. §119 from Japanese Patent Application No. 2012-026145 filed Feb. 9, 2012, the entire contents of which are incorporated herein by reference.

BACKGROUND OF THE INVENTION

1. Field of the Invention

The invention relates to the field of parallelization of programs. More particularly, the present invention relates to a method for speeding up a simulation system through parallel execution of a program.

2. Description of the Related Art

Recently, multiprocessor systems with a plurality of processors have been used in fields such as scientific computing and simulation. In these systems, application programs generate a plurality of processes, and these processes are allocated to individual processors and executed.

In the field of simulation, which has seen extensive development in recent years, there is software for mechatronic "plant" simulations of robots, automobiles and airplanes. Due to the development of electronic components and software technology, most of the controls are performed electronically using wires and wireless LAN configured like the nerves of a robot, automobile, or airplane.

A large amount of control software is built into mechanical devices. When these products are developed, there is an extensive length of time, an enormous cost, and a large number of personnel required for development and testing of the programs.

The method commonly used in testing is "hardware in the loop simulation" (HILS). The environment used to test the electronic control unit (ECU) for an entire automobile is called a full-vehicle HILS. In a full-vehicle HILS, the actual ECU itself is connected to a dedicated hardware device used to emulate an engine or transmission in a laboratory, and testing is performed in accordance with predetermined scenarios. The output from the ECU is inputted to a monitoring computer, and displayed so that testing personnel can check for anomalous behavior while viewing the display.

However, because a dedicated hardware apparatus is used and physical wiring is required between the device and the actual ECU, the amount of preparation required for HILS is extensive. Also, replacement and testing of another ECU requires a large amount of time because physical reconnection is required. In addition, because the actual ECU is tested, the testing has to be performed in real time. Therefore, an enormous amount of time is required when many scenarios are tested. Also, hardware devices for HILS emulation are generally very expensive.

Recently, a method consisting of software which does not require an expensive hardware device for emulation has been proposed. This method is known as "software in the loop simulation" (SILS). Using this method, the microcomputer mounted in the ECU, the input/output circuit, the control scenario, and the plant, such as an engine or a transmission, all consist of a software emulator. This can even be used to perform testing without the ECU hardware.

A system that can be used to help build a SILS is MATLAB®/Simulink®, which is a simulation modeling system available from MathWorks®. When MATLAB®/Simulink® is used, a simulation program can be created by arranging functional blocks on a screen using a graphical interface, and the processing flow is indicated by connecting the function blocks to each other using arrows. These block diagrams represent the processing performed in the simulation during a single time step. By repeating this a predetermined number of times, the behavior of the simulated system can be obtained in a time series.

When a block diagram with function blocks has been created using MATLAB®/Simulink®, the equivalent functions can be converted to source code in an existing computer language, such as C. This can be accomplished using, for example, Real-Time Workshop® functions. By compiling the source code in C, a simulation can be executed as a SILS in another computer system.

As multiprocessor and multicore computer systems have become more widely available, technologies have been proposed to speed up execution of a program written using block diagrams by dividing the program into groups known as segments, and then allocating these segments to different processors or cores for parallel execution.

In U.S. Patent App. Publication No. 2011/0107162, the counterpart of Japanese Patent No. 4,886,838, when, in a block diagram, output from a function block without an internal state is used by function block A with an internal state, function block A is called a use block of the function block without an internal state. When output from function block A with an internal state is used as input for a function block without an internal state in a calculation, function block A is called a definition block of the function block without an internal state. By visiting each function block as a node, the number of use block sets/definition block sets can be determined for each function block on the basis of the connection relationship between the function blocks with an internal state and function blocks without an internal state. Strands can be allocated on the basis of this number, enabling the block diagram to be divided into strands for parallel processing.

From the perspective of a method for solving this numerically, models written using block diagrams can resemble expressions of an explicit simultaneous ordinary differential equation in state-space form. From this perspective, Kasahara Hironori, Fujii Toshihisa, Honda Hiroki, Narita Seinosuke, "Parallel Processing of the Solution of Ordinary Differential Equations Using Static Multiprocessor Scheduling Algorithms", IPSJ [Information Processing Society of Japan] Journal 28 (10), 1060-1070, Oct. 15, 1987, relates to a parallel processing method for solving explicit ordinary differential equations, and discloses a parallel processing method for solving ordinary differential equations compatible with a variety of granularities which consists of task generation, optimum task scheduling of processors, and machine code generation using scheduling results.

SUMMARY OF INVENTION

According to on aspect of the present invention, a method for solving ordinary differential equations is described in a graphical model with nodes as blocks and dependencies as links that uses the processing of a computer with a plurality of processors. The method includes: generating segments of blocks with or without duplication for each block with an internal and for each block without any output by traversing the graphical model from each block with an internal state to each block without any output; merging the segment to reduce duplication; compiling and converting each segment from the merged results into an executable code; and individually allocating the executable code for each segment to the plurality of processors for parallel execution.

According to another aspect of the present invention, a non-transitory article of manufacture is provided which tangibly embodies the processing of a computer with a plurality of processors which when implemented, causes a computer to perform the steps of the method for solving ordinary differential equations in a graphical model with nodes as blocks and dependencies as links.

According to still another aspect of the present invention, a system for solving ordinary differential equations described in a graphical model with nodes as blocks and dependencies as links that uses the processing of a computer with a plurality of processors. The system includes: a memory; a processor communicatively coupled to the memory; and a feature selection module communicatively coupled to the memory and the processor, where the feature selection module is configured to perform the steps of the method for solving ordinary differential equations is described in a graphical model with nodes as blocks and dependencies as links.

DETAILED DESCRIPTION OF PREFERRED EMBODIMENTS

The present invention provides a method that accelerates execution speeds of simulations on a multiprocessor or multicore computer by segmenting a program written in a graphical format, such as a block diagram, that is balanced and does not require communication during a single time step, and then allocating segments to a plurality of processors of parallel execution. The method exploits the inherent property of the state-space form (SSF) of ordinary differential equations that a model essentially represents.

Segments consisting of sets of blocks needed to calculate inputs to each block with an internal state and each block without any outputs are extracted by traversing a graphical model from blocks calculating inputs to blocks with internal states and from blocks without any output in the opposite direction of the dependencies. Blocks can be duplicated among segments.

Further, segments are merged to reduce duplication, and the number of segments is reduced to a number for parallel execution. Duplication between segments is reduced by merging segments with many of the same blocks. The number for parallel execution is typically the number of available core or processors.

Next, a system according to the present invention compiles each of the resulted segments, and allocates the resulting executable code to each core or processor for parallel execution.

A configuration and processing of a preferred embodiment of the present invention will now be described with reference to the accompanying drawings. In the following description, elements that are identical are referenced by the same reference numbers in all of the drawings unless otherwise noted. The configuration and processing explained here are provided as preferred embodiments, it should be understood that the technical scope of the present invention is not intended to be limited to these embodiments.

Figure 1:
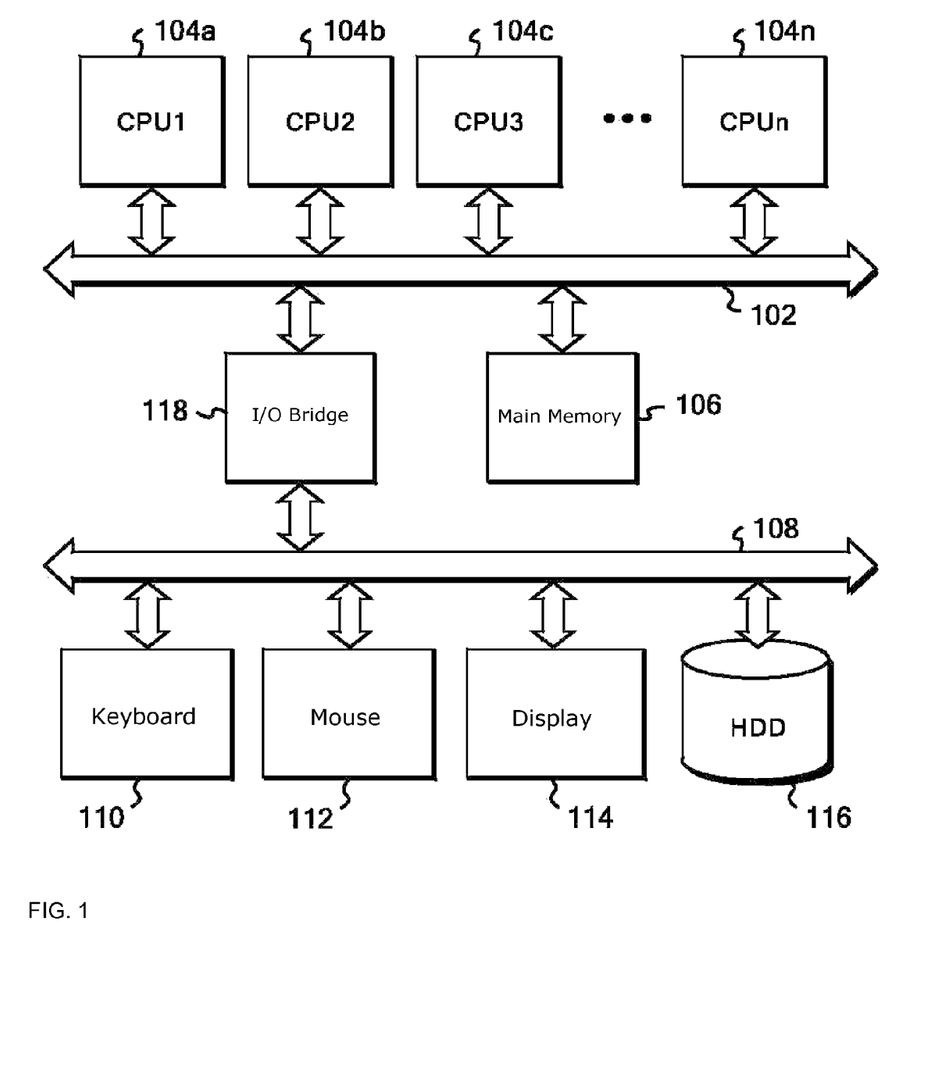
FIG. 1 is a block diagram of hardware used to carry out an embodiment of the present invention.

First, the hardware of a computer used in an embodiment of the present invention will be explained with reference to FIG. 1. In FIG. 1, CPU1 104a, CPU2 104b, CPU3 104c, . . . , and CPUn 104n are connected to a host bus 102. Main memory 106 used in the arithmetic processing of CPU1 104a, CPU2 104b, CPU3 104c, . . . , and CPUn 104n is also connected to the host bus 102.

A keyboard 110, mouse 112, display 114 and a hard disk drive 116 are connected to an I/O bus 108. I/O bus 108 is connected to host bus 102 via an I/O bridge 118. Keyboard 110 and mouse 112 are used by the operator to perform such operations as typing in commands and clicking menus. If necessary, display 114 can be used to display menus so that an embodiment of the present invention described below can be manipulated using a GUI.

Computer system hardware suitable for achieving this purpose is IBM® System X. Here, CPU1 104a, CPU2 104b, CPU3 104c, . . . , and CPUn 104n are Intel® Xeon® chips, and the operating system is Windows™ Server 2003. The operating system is stored in hard disk drive 116. When the computer system is started, the operating system is read from hard disk drive 116 to main memory 106.

A multiprocessor system has to be used to carry out the present invention. A multiprocessor system is a system using a processor with multiple cores functioning as processors able to perform arithmetic processing independently. This should be understood to include multicore/single-processor systems, single-core/multiprocessor systems, and multicore/multiprocessor systems.

The Intel® Core™ series such as Intel® Core™2 Quad is preferably used as a multicore processor.

Computer system hardware able to embody the present invention is not limited to IBM® System X. Any computer system, including personal computers, can be used as long as it can run the simulation program of the present invention. The operating system is not limited to Windows®. Other operating systems such as Linux® and MacOS® can also be used. In order to run the simulation program at high speeds, a computer system using the IBM® AIX™ System P operating system based on POWER 6™ can be used.

Hard disk drive 116 includes MATLAB®/Simulink® simulation modeling tool 202, main routine 206, segment extraction routine 208, merge processing routine 212, code conversion routine 216, and a C compiler or C++ compiler 220. These are loaded into main memory 106 and executed in response to operations performed by the operator using keyboard 110 or mouse 112. The tool and the routines will be explained below with reference to FIG. 2. Main routine 206, segment extraction routine 208, and merge processing routine 212 can be created by writing code in an existing computer programming language, such as Java®, C, C++ or C#, and then compiling the code using a predetermined compiler.

Simulation modeling tool 202 is not limited to MATLAB®/Simulink®. Simulation modeling tools, such as open source Scilab/Scicos, can be used.

Also, depending on the situation, the source code of the simulation system can be written directly using C or C++ without using a simulation modeling tool. Depending on the situation, the present invention can also be realized by writing each function as individual function blocks that are dependent on each other.

Figure 2:
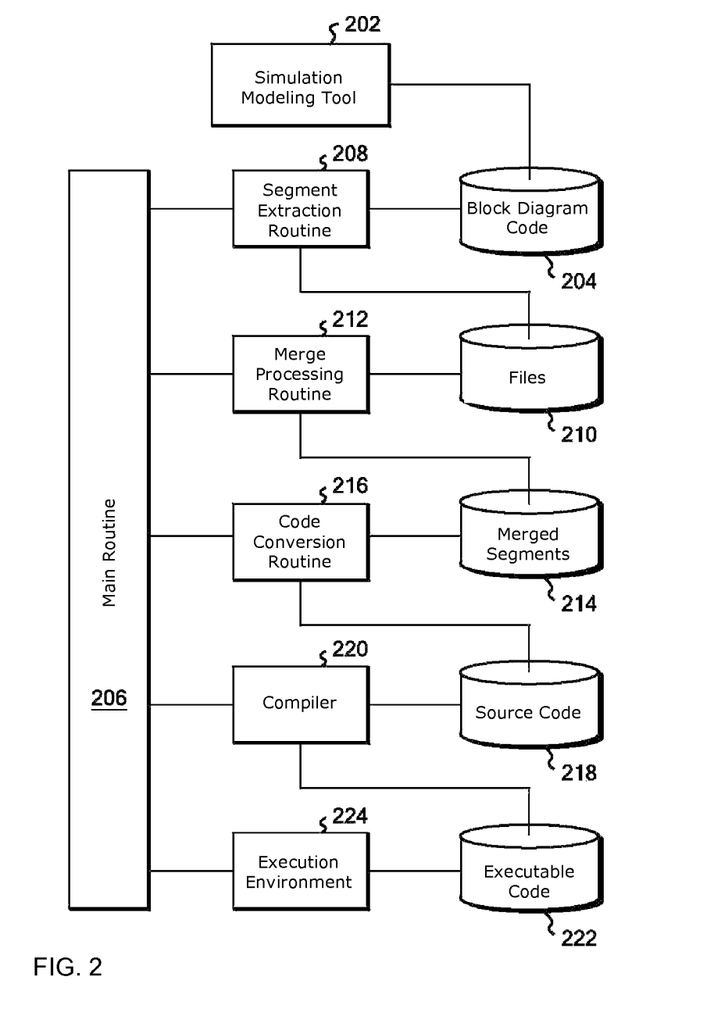
FIG. 2 is a configuration of a functional block diagram used to carry out an embodiment of the present invention.
Figure 3:
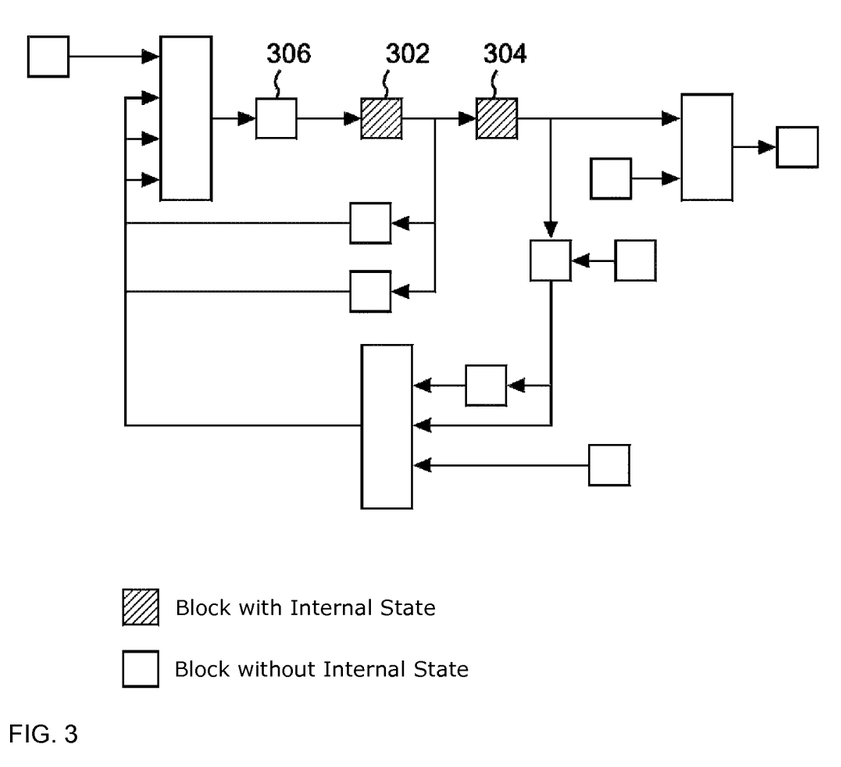
FIG. 3 is a diagram used to explain a block diagram to be inputted in an embodiment of the present invention.

FIG. 2 is a block diagram of the processing elements in an embodiment of the present invention. In FIG. 2, block diagram code 204 created by the operator using a simulation modeling tool 202 is stored in hard disk drive 116. As shown in FIG. 3, block diagram code 204 is written in graphic format in which blocks with functions are treated as nodes, and dependencies are treated as links. Preferably, the dependencies are written in a format such as XML.

The main routine 206 has the functions for integrating the entire process. In response to operations performed by the operator using keyboard 110 or mouse 112, it calls up segment extraction routine 208, merge processing routine 212, code conversion routine 216, and compiler 220.

Segment extraction routine 208 has functions, which divide the function blocks in block diagram code 204 into a plurality of segments which allow duplication of blocks, and write the segments to hard disk drive 116 as files 210. The processing performed in segment extraction routine 208 is explained in greater detail below with reference to the flowcharts in FIG. 6 and FIG. 7.

Merge processing routine 212 has functions which reduce the duplication of blocks, generate merged segments, and write the merged segments to hard disk drive 116 as files 214. The processing performed in merge processing routine 212 is explained in greater detail below with reference to the flowchart in FIG. 8.

Code conversion routine 216 has a function which converts code written using block diagrams into, for example, source code written in C. Converted source code 218 is preferably written to hard disk drive 116. Realtime Workshop®, available from MathWorks®, is preferably used as code conversion routine 216.

Compiler 220 compiles source code 218 by segment to generate executable code 222, and preferably stores executable code 222 on hard disk drive 116. Compiler 220 can be any compiler able to generate code that is compatible with CPU1 104$a$, CPU2 104$b$, CPU3 104$c$, . . . , and CPUn 104$n$.

Execution environment 224 has a function which allocates executable code 222 by segment to CPU1 104$a$, CPU2 104$b$, CPU3 104$c$, . . . , and CPUn 104$n$ for parallel execution.

FIG. 3 shows an example of a block diagram to be inputted in an embodiment of the present invention. A block diagram in an embodiment of the present invention represents processing performed during a single time step of a simulation. By repeating this a predetermined number of times, the behavior of the system that is being simulated can be obtained in a time series.

More specifically, the two processes described below represent the processing performed during a single time step. (This can be repeated a plurality of times by the solver during the processing of a single time step, but this does not preclude application of the present invention as the basic processing steps remain unchanged.)

1) The outputs of all blocks are calculated according to the following routine.

a) The outputs of blocks with internal states can be calculated on any timing because the blocks with internal states do not require inputs to the block to calculate their outputs. They can calculate their outputs just by using their internal states. When block 302 and block 304 in FIG. 3 are blocks with internal states, the output's calculation can be started from these blocks.

b) Because the outputs of blocks without internal state are calculated on the basis of the inputs to the blocks, the outputs of these blocks are calculated after the inputs have been calculated. The outputs from blocks other than block 302 and block 304 in FIG. 3 can be calculated only after the inputs have been calculated. If a block has no input, the calculation of the outputs can be started with the block.

2) Because the input values to the blocks with an internal state are calculated using the aforementioned process (the output from block 302 and block 306 in FIG. 3), this can be used to update the internal states for the next time step.

Here, the input to blocks with internal state s is considered not to exist in the step for calculating the output from the blocks in a single time step. This is called non-direct feed through (NDF). The input to block 302 and block 304 in FIG. 3 is the NDF, and this is the output from block 306 and block 302, respectively.

Figure 4:
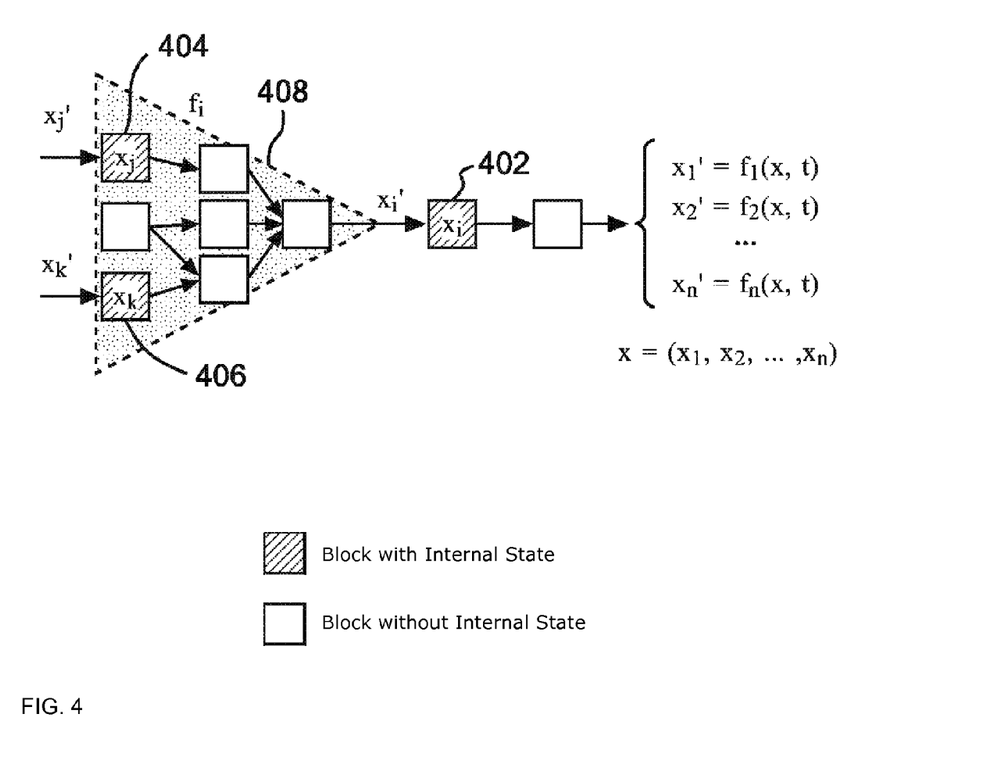
FIG. 4 is a diagram explaining the concept used to extract segments in the processing performed according to an embodiment of the present invention.

A block diagram represented in this way preferably represents the state-space form of an ordinary differential equation (ODE/SSF) as indicated on the right in FIG. 4.

This becomes a system of equations in which the variable x' necessary to update the state variable is on the left side, and the function that takes the state variable x as its input is on the right side. (Generally, the variable on the left side is a time derivative of the state variable. However, the variable on the left side is not limited only to a time derivative in Simulink® and similar products. Here, to make it more general, we refer to x', that is the variable on the left hand side, as a variable necessary to update the state variable.)

The general procedure for numerically solving such an ordinary differential equation is the calculation processing for a block diagram described above, in which all of the right side functions are evaluated on the basis of the state variables provided in a given time step to obtain the values for the left side variables, and the state variables for the next time step are calculated on the basis of the values of the left side variables.

FIG. 4 shows the correspondence between the ODE/SSF and (some of) the block diagram. The blocks with an internal state are block 402, block 404 and block 406.

Here, block 402 is the focus, and the internal state (the state variable in state-space form) is $x_i$. Then, the variable $x_i'$ necessary to update the internal state (state variable) $x_i$ corresponds to the input to block 402, and the set of blocks necessary to calculate this variable $x_i'$ (the blocks surrounded by triangle 408) correspond to the $f_i$ that is on the right hand side of the system of equations.

Here, in order to calculate the value for $x_i'$ in a time step, the variables $x_j'$ and $x_k'$, necessary to update other state variables, are not required. In other words, NDF input is not required. Note that the blocks calculating $x_j'$ and $x_k'$ are not included in the set.

All of the functions of equations on the right hand side in FIG. 4 can be calculated individually, that is, in parallel. The method of an embodiment of the present invention applies the parallelism among right hand side functions to parallel processing of the calculations of block diagrams. Therefore an embodiment of the present invention achieves the acceleration of simulations by extracting sets of blocks corresponding to functions on the right hand side of the ODE/SSF and executing them in parallel.

Figure 5:
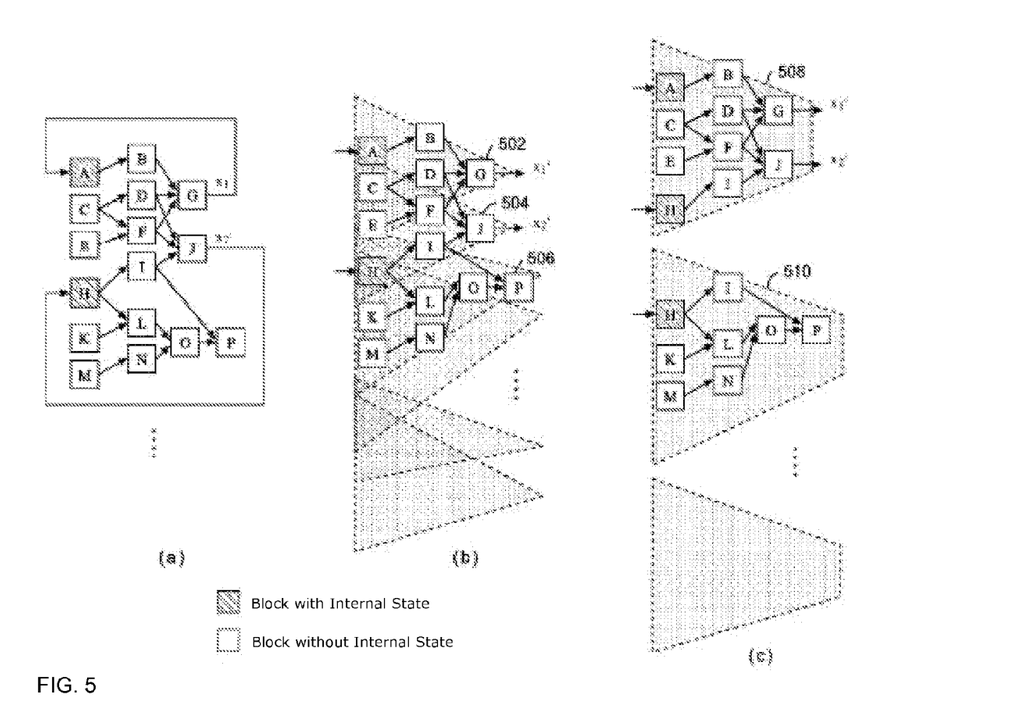
FIG. 5 is a diagram used to explain an outline of the processing performed according to an embodiment of the present invention.

FIG. 5 is a diagram explaining the method of extracting units (segments) from a block diagram to be executed in parallel based on the concept described above.

For the sake of convenience, in the following explanation blocks in FIG. 5 (a) are rearranged so that blocks with internal states are located at the beginning of the graph and each block is assigned a letter A-P. When these letters are used, the blocks with internal states in FIG. 5 (a) are block A and block H.

In the processing performed in segment extraction routine 208, the graph is traversed from the blocks that calculate NDF inputs and the blocks without any output (that is, blocks G, J and P in FIG. 5 (a)) in the opposite direction of the dependencies, that is, in the opposite direction of the arrows in the links, and segments are extracted which consist of sets of blocks necessary to calculate inputs for blocks with internal states and sets of blocks necessary to calculate blocks without any output (allowing duplication of blocks with other segments). This process will be explained in greater detail below with reference to the flowcharts in FIG. 6 and FIG. 7.

As a result of segmentation and as shown in FIG. 5 (b), segment 502 corresponding to $x_1'$, segment 504 corresponding to $x_2'$, and segment 506 corresponding to block P without any output are obtained. In FIG. 5 (b), blocks C, E and F are duplicated in segment 502 and segment 504. Because of this duplication, each segment is independent of the other segments and can be calculated in parallel. However, if there are too many duplicates, the calculations can be performed in parallel, but the processing time is not shortened. In some practical block diagrams containing about 4,000 blocks, the number of segments extracted by the above procedure tends to be a very large number like 400 to 1,000. Ordinary hardware cannot execute all segments in parallel at once.

To mitigate this situation, merge processing routine 212 shown in FIG. 5 (c), the segments are merged so that duplication between segments is reduced (ultimately, so that the maximum time necessary to calculate each merged segment is minimized) until the number of segments is less than or equal to the number of available cores or processors. As a result, merged segments 508, 510, etc. are obtained. Although some duplication of blocks between segments can remain after the above procedure, no communication is required in a single time step on account of the duplication. The merge processing reduces the large amount of duplication in the initial segments, and allows for more effective parallel execution.

Each segment in the stage shown in FIG. 5 (c) is converted to source code by code conversion routine 216, converted to executable code by compiler 220, and allocated to individual cores or processors by execution environment 224 for parallel execution.

Figure 6:
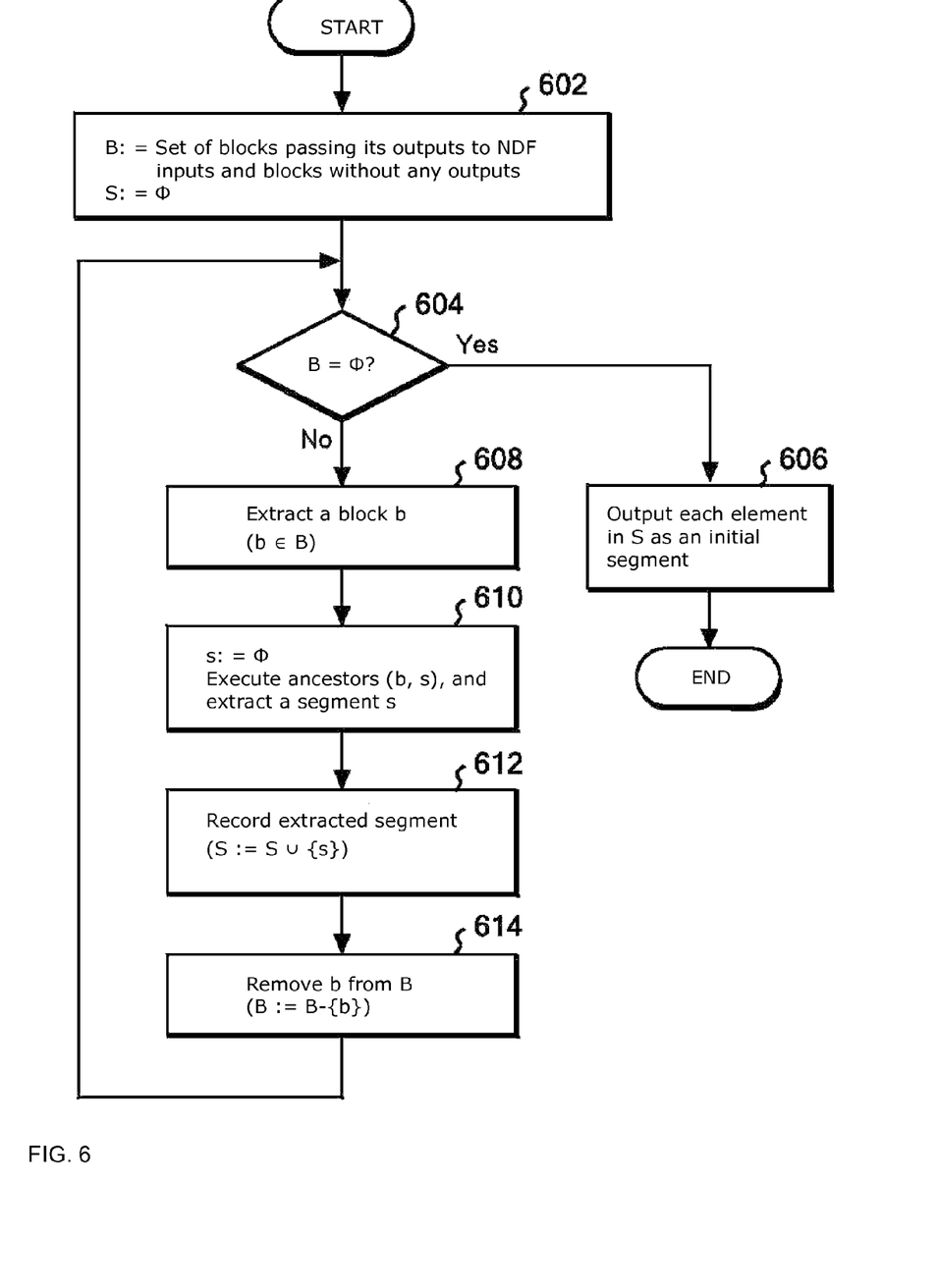
FIG. 6 is a flowchart showing the segment extraction process according to an embodiment of the present invention.
Figure 7:
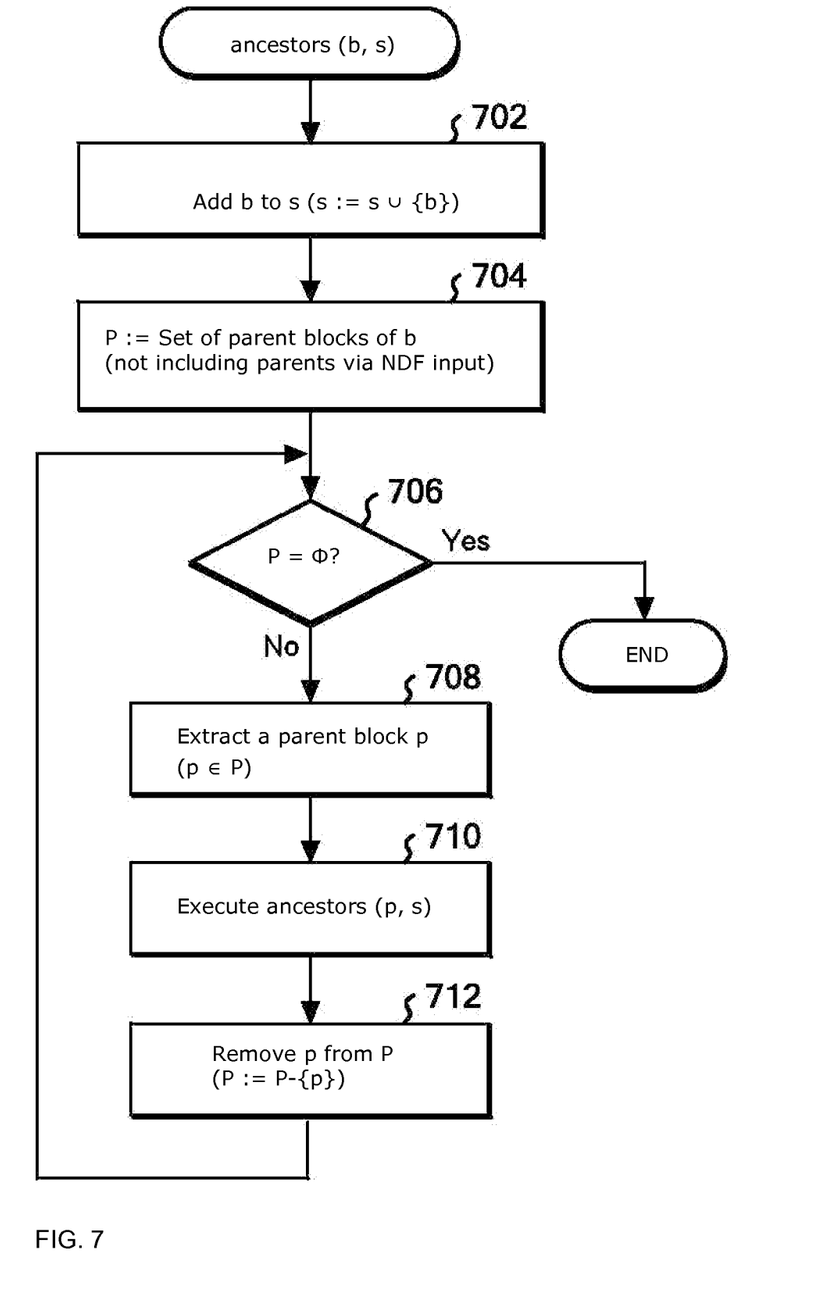
FIG. 7 is a flowchart showing a subroutine called up by the segment extraction process according to an embodiment of the present invention.

FIG. 6 and FIG. 7 are flowcharts of the processing performed by segment extraction routine 208.

In Step 602 of FIG. 6, segment extraction routine 208 produces B:=sets of blocks passing output to NDF input, that is, parent blocks of blocks with an internal state (blocks upstream of the arrows for dependencies), and blocks without any output. In Step 602, S is an empty set, which is φ.

In Simulink®, the following blocks can have NDF input. However, the present invention is not limited to this example.

Integrator: a block for integral calculation
Discrete Filter: a block realizing an infinite impulse response (IIR) filter and finite impulse response (FIR) filter
Transfer Function: a block representing a transfer function (NDF corresponds to dx/dt)
S-function: a block allowing the user to freely define a function
Rate Transition: a block representing a change in the sample time In Step 604, segment extraction routine 208 determines whether or not B is an empty set. If so, Step 606 outputs each element in S as an initial segment, stores the segment as a file 210 in the hard disk drive 116, and ends the process.

When it is determined in Step 604 that B is not an empty set, segment extraction routine 208 in Step 608 takes b, which is an element of B.

In Step 610, segment extraction routine 208 sets s as an empty set, calls up ancestors (b, s), and extracts segment s. Ancestors (b, s) are explained below with reference to the flowchart in FIG. 7.

In Step 612, segment extraction routine 208 records the segment extracted using ancestors (b, s) as S:=S∪{s}

In Step 614, segment extraction routine 208 deletes b from B as B:=B−{b}, and returns to the determination process in Step 604.

When B is not empty from the beginning, the elements in B are gradually removed by performing the loop consisting of Steps 604, 608, 610, 612 and 614. When it is finally empty, the process is ended from Step 604 via Step 606.

FIG. 7 is a flowchart of the processing performed in the ancestors (b, s) subroutine called up in FIG. 6.

In Step 702 of the ancestors (b, s) subroutine, b is added to s as s:=s∪{b}.

In Step 704 of the ancestors (b, s) subroutine, a set of parent blocks of b is denoted as P. This does not include parents via NDF input.

In Step 706 of the ancestors (b, s) subroutine, it is examined whether or not P is an empty set. If not, one parent p∈P is taken in Step 708.

In Step 710 of the ancestors (b, s) subroutine, the ancestors (p, s) are called up again. In Step 712, p is removed from P as P:=P−{p} and the ancestors (b, s) are returned to Step 706 to examine whether or not P is an empty set. When this has been repeated until P has become an empty set, the process returns to Step 610 in FIG. 6.

Figure 8:
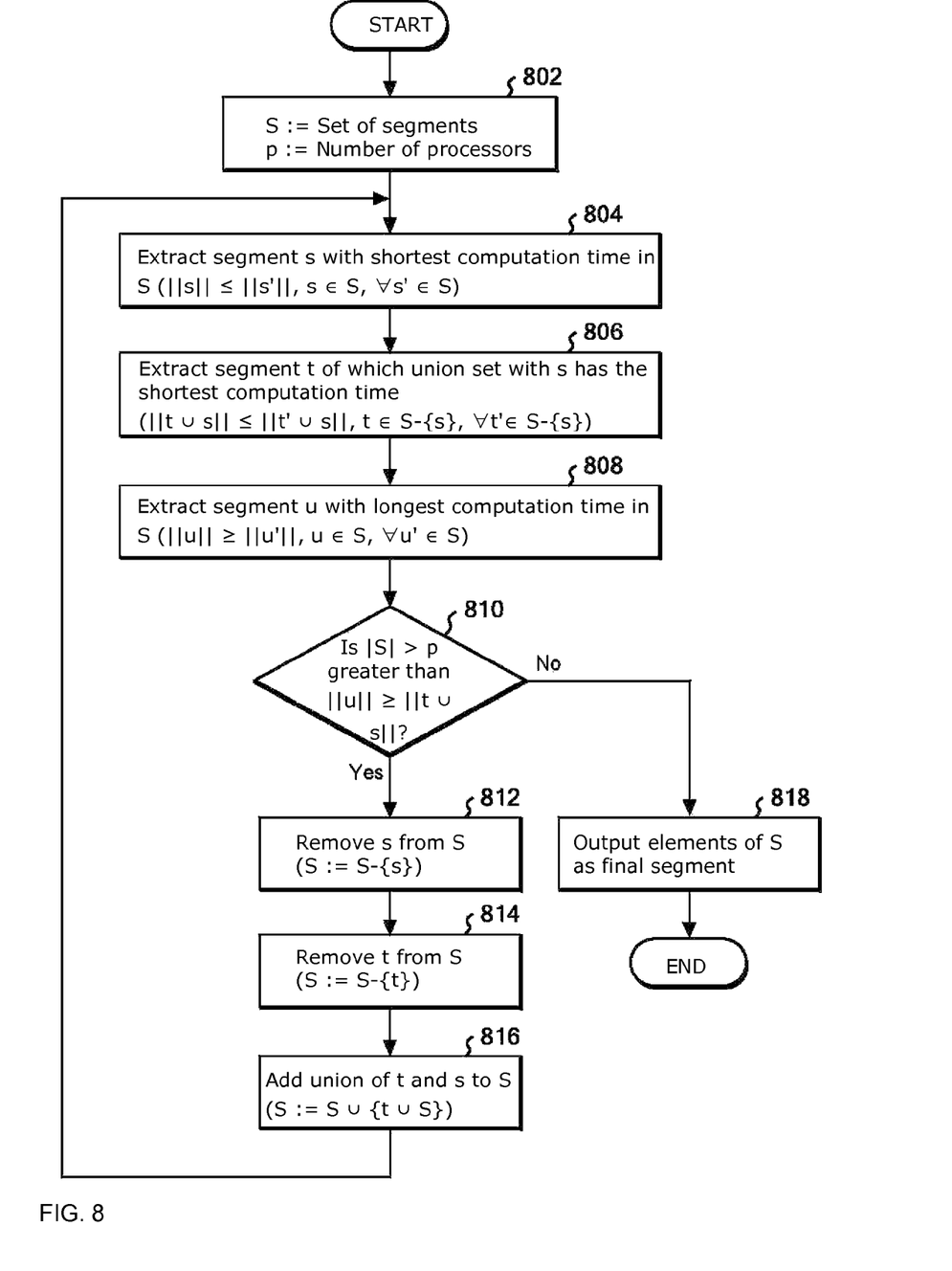
FIG. 8 is a flowchart showing the segment merging process according to an embodiment of the present invention.

FIG. 8 is a flowchart of the processing performed in the merge processing routine. In Step 802 of FIG. 8, merge processing routine 212 establishes S:=segment sets, and p:=number of processors. The segment sets are obtained from files 210 written by segment extraction routine 208 as shown in FIG. 2. The number of processors can be set as a predetermined number on the basis of the available hardware.

In Step 804, merge processing routine 212 extracts the segment s with the shortest computation time in S. In other words, s meets the following conditions:

$$\|s\| \le \|s'\|, s \in S, \forall s' \in S$$

Here, ∥s∥ denotes the computation time necessary to calculate the output of all blocks included in s. The computation time can be obtained by measuring the computation time necessary for each block in advance, or by determining the computation time for each block from specifications and then summing up the computation time for all blocks included in the segment.

In Step 806, the merge processing routine 212 extracts segment t, of which union with s has the shortest total computation time. In other words, t meets the following conditions:

$$\|t \cup s\| \le \|t' \cup s\|, t \in S-\{s\}, \forall t' \in S-\{s\}$$

It should be noted that the union among elements in S like t∪s results in a set of blocks because an element in S is a set of blocks. Therefore, set operations like union among t and s should handle each block as an element.

In Step 808, merge processing routine 212 extracts u, the segment with the longest computation time in S. In other words, u meets the following conditions:

$$\|u\| \geq \|u'\|, u \in S, \forall u' \in S$$

In Step 810, merge processing routine 212 determines whether |S|>p or $\|u\| \geq \|t \cup s\|$. Here, |S| is the number of elements in S.

If |S|>p or $\|u\| \geq \|t \cup s\|$, merge processing routine 212 removes s from S as S:=S−{s} in Step 812, removes t from S as S:=S−{t} in Step 814, adds an element consisting of the union of t and s to S as S:=S∪{t∪s} in Step 816, and returns to Step 804.

As the processing continues, the determination in Step 810 is negative at some stage. In other words, the condition |S|≤p and $\|u\| < \|t \cup s\|$ is met. Here, the number of current segments is less than the number of processors, and all of the segments can be executed in parallel without any further merging of segments. Also, when segment s with the shortest computation time is merged with any other segment, the maximum value for the computation time would only increase from the present condition and degrades performance during parallel execution. Therefore, the merge process is ended here.

At this stage, in Step 818, merge processing routine 212 outputs the elements in S as the final segment. In other words, they are outputted as merged segment 214 in FIG. 2 and the process is ended.

Figure 9:
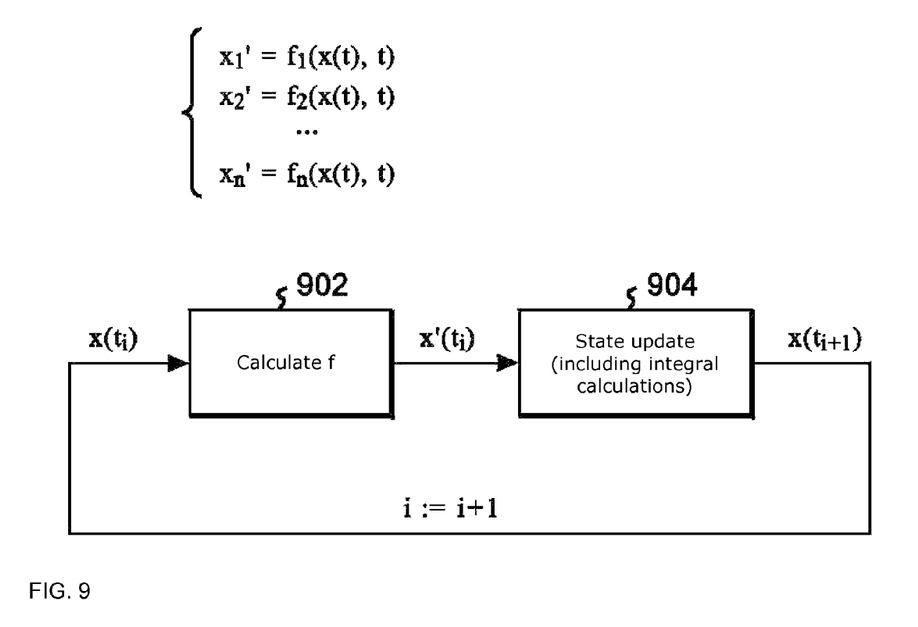
FIG. 9 is a diagram used to explain the process performed by a computer to solve an ordinary differential equation using sequential processing according to an embodiment of the present invention.

FIG. 9 schematically illustrates the numerical solving method of a general ODE/SSF performed by a computer. The ODE/SSF is shown below.

$$x'_1 = f_1(x(t), t)$$
$$x'_2 = f_2(x(t), t)$$
$$\ldots$$
$$x'_n = f_n(x(t), t)$$

When parallelization is not employed, the calculations for $f_1, f_2, \ldots,$ and $f_n$ are processed sequentially in block 902 of FIG. 9.

After the processing in Block 902, state update processing 904, including integration of the derivative term $x'(t_i)$ to $x(t_{i+1})$, is required. This is preferably accomplished using the Runge-Kutta method.

Figure 10:
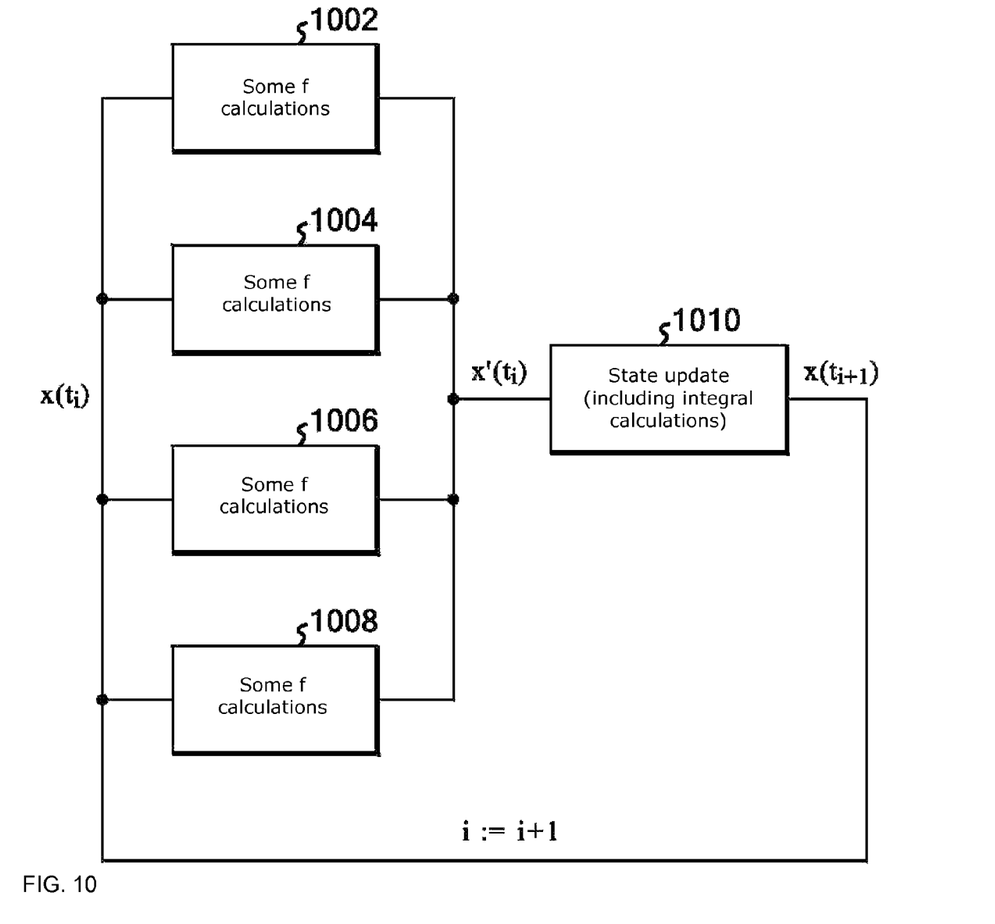
FIG. 10 is a diagram used to explain the process performed by a computer to solve an ordinary differential equation using parallelization according to an embodiment of the present invention.

FIG. 10 schematically illustrates the method of breaking down the sequential calculations for $f_1, f_2, \ldots,$ and $f_n$ shown in FIG. 9 into segments. Here, the segments are allocated to four cores or processors for parallel execution. In FIG. 10, the graph of the block diagram corresponding to the sequential calculations for $f_1, f_2, \ldots,$ and $f_n$ is divided into four segments according to an embodiment of the present invention, and block 1002, block 1004, block 1006 and block 1008 are executed in parallel. In the processing performed in FIG. 10, state update process 1010, including integration of the derivative term $x'(t_i)$ to $x(t_{i+1})$, is required. State update process 1010 is performed after the f calculations have been completed. In this way, it can be performed immediately by any CPU because the CPUs are not busy after the completion of the parallel calculation of block 1002, block 1004, block 1006 and block 1008.

The present invention was explained above with reference to a particular embodiment. However, the present invention is not limited to this particular embodiment. It is to be understood that various modifications, substitutions and methods obvious to those skilled in the art can be applied. For example, the present invention is not limited to a particular processor architecture or operating system.

It should also be understood that, although the aforementioned embodiment has been described using MATLAB®/Simulink®, the invention is not limited thereto, and is applicable to any other modeling tool.

What is claimed is:

1. A method for solving ordinary differential equations for accelerating execution speeds of simulations through parallel execution, wherein the ordinary differential equations are described in a graphical model with nodes as blocks and dependencies as links and using the processing of a computer with a plurality of processors, said method comprising the steps of:
   generating segments of blocks with or without duplication for each block with an internal state and for each block without any output by traversing said graphical model from each said block with an internal state to each said block without any output;
   merging said segments to reduce duplication;
   compiling and converting each segment from said merged results into an executable code; and
   individually allocating said executable code for each segment to the plurality of processors for parallel execution;
   wherein the ordinary differential equations described in the graphical model are solved using said parallel execution of said executable code.

2. The method of claim 1, wherein said step for generating segments has a step for adding a block to a segment, wherein said added block to said segment follows a parent block, which is not comprised of a dependency, and wherein said dependency does not exist within a single time step including an input to said block with an internal state.

3. The method of claim 1, wherein said step for merging segments to reduce duplication comprises the steps of:
   (a) extracting a segment s having a shortest computation time relative to each of one or more segments in a set of segments;
   (b) extracting a segment t having a shortest computation time relative to each of one or more blocks comprised in a union set of segment s and segments t;
   (c) extracting a segment u having a longest computation time relative to each of the one or more segments in said set of segments;
   (d) determining whether a number of said set of segments is greater than a number of said processors, or whether the longest computation time of said segment u is greater than the shortest computation time of said union set of segment s and segment t;
   (e) removing said segment s and said segment t from said set of segments, adding said union set of segment s and segment t, and repeating said process from step (a) when said determining step of (d) is affirmative; and
   (f) outputting and merging said set of segments when said determining step of (d) is negative.

4. The method of claim 1, wherein said blocks with an internal state are comprised of blocks for integral calculation or user-defined blocks.

5. The method of claim 1, wherein said computer with the plurality of processors is comprised of a multicore processor.

6. A non-transitory article of manufacture tangibly embodying the processing of a computer with a plurality of processors to perform the steps of a computer-implemented method for solving ordinary differential equations for accelerating execution speeds of simulations through parallel execution, wherein the ordinary differential equations are described in a graphical model with nodes as blocks and dependencies as links, said method comprising the steps of:

generating segments of blocks with or without duplication for each block with an internal state and for each block without any output by traversing said graphical model from each said block with an internal state to each said block without any output;

merging said segments to reduce duplication;

compiling and converting each segment from said merged results into an executable code; and individually allocating said executable code for each segment to the plurality of processors for parallel execution;

wherein the ordinary differential equations described in the graphical model are solved using said parallel execution of said executable code.

7. The article of manufacture according to claim 6, wherein said step for generating segments has a step for adding a block to a segment, wherein said added block to said segment follows a parent block, which is not comprised of a dependency, and wherein said dependency does not exist within a single time step including an input to said block with an internal state.

8. The article of manufacture according to claim 6, wherein said step for merging segments to reduce duplication comprises the steps of:

(a) extracting a segment s having a shortest computation time relative to each of one or more segments in a set of segments;

(b) extracting a segment t having a shortest computation time for relative to each of one or more blocks comprised in a union set of segment s and segment t;

(c) extracting a segment u having a longest computation time relative to each of the one or more segments in said set of segments;

(d) determining whether a number of said set of segments is greater than a number of said processors, or whether the longest computation time of said segment u is greater than the shortest computation time of said union set of segment s and segment t;

(e) removing said segment s and said segment t from said set of segments, adding said union set of segment s and segment t, and repeating said process from step (a) when said determining step of (d) is affirmative; and (f) outputting and merging said set of segments when said determining step of (d) is negative.

9. The article of manufacture according to claim 6, wherein said blocks with an internal state are comprised of blocks for integral calculation or user-defined blocks.

10. The article of manufacture according to claim 6, wherein said computer with the plurality of processors is comprised of a multicore processor.

11. A system for solving ordinary differential equations for accelerating execution speeds of simulations through parallel execution, wherein the ordinary differential equations are described in a graphical model with nodes as blocks and dependencies as links and using the processing of a computer with a plurality of processors, said system comprising:

a memory;

a processor communicatively coupled to the memory; and a feature selection module communicatively coupled to the memory and the processor, wherein said feature selection module is configured to perform the steps of a method comprising:

generating, by a processor, segments of blocks with or without duplication for each block with an internal state and for each block without any output by traversing said graphical model from each said block with an internal state to each said block without any output;

merging said segments to reduce duplication;

compiling and converting each said segment from said merged results into an executable code; and individually allocating said executable code for each segment to the plurality of processors for parallel execution;

wherein the ordinary differential equations described in the graphical model are solved using said parallel execution of said executable code.

12. The system according to claim 11, wherein said step for generating segments has a step for adding a block to a segment, wherein said added block to said segment follows a parent block, which is not comprised of a dependency, and wherein said dependency does not exist within a single time step including an input to said block with an internal state.

13. The system according to claim 11, wherein said step for merging segments to reduce duplication comprises a method of:

(a) extracting a segment s having a shortest computation time relative to each of one or more segments in a set of segments;

(b) extracting a segment t having a shortest computation time for relative to each of one or more blocks comprised in a union set of segment s and segment t;

(c) extracting a segment u having a longest computation time relative to each of the one or more segments in said set of segments;

(d) determining whether a number of said set of segments is greater than a number of said processors, or whether the longest computation time of said segment u is greater than the shortest computation time of said union set of segment s and segment t;

(e) removing said segment s and said segment t from said set of segments, adding said union set of segment s and segment t, and repeating said process from step (a) when said determining step of (d) is affirmative; and (f) outputting and merging said set of segments when said determining step of (d) is negative.

14. The system according to claim 11, wherein said blocks with an internal state include blocks for integral calculation or user-defined blocks.

15. The system according to claim 11, wherein said computer with the plurality of processors is comprised of a multicore processor.

* * * * *